United States Patent [19]

Tsai et al.

[11] Patent Number: 5,049,799
[45] Date of Patent: Sep. 17, 1991

[54] HIGH PERFORMANCE CONTROLLER FOR VARIABLE DISPLACEMENT HYDRAULIC MOTORS

[75] Inventors: Shan-Chin Tsai; Donald G. Kilroy, both of Rockford, Ill.

[73] Assignee: Sundstrand Corporation, Rockford, Ill.

[21] Appl. No.: 528,553

[22] Filed: May 25, 1990

[51] Int. Cl.$^5$ .............................................. G05B 1/06
[52] U.S. Cl. .................................... 318/652; 318/626; 318/567; 318/561; 417/217; 417/222 S; 91/506
[58] Field of Search ............... 318/652, 626, 567, 561; 417/222, 217; 91/506

[56] References Cited

U.S. PATENT DOCUMENTS

| | | | |
|---|---|---|---|
| 4,474,104 | 10/1984 | Creffield | 91/497 |
| 4,487,109 | 12/1984 | Burandt et al. | 91/506 |
| 4,498,037 | 2/1985 | Razavi | 318/561 |
| 4,733,149 | 3/1988 | Culberson | 318/561 |
| 4,801,857 | 1/1989 | Bundy | 318/626 |
| 4,950,967 | 8/1990 | Sakamoto et al. | 318/567 |

*Primary Examiner*—William M. Shoop, Jr.
*Assistant Examiner*—Saul M. Bergmann
*Attorney, Agent, or Firm*—Antonelli, Terry, Stout & Kraus

[57] ABSTRACT

In a control (100) for a variable displacement hydraulic motor (12) having an electrically controlled hydraulic servo valve (14) for controlling the displacement of a hydraulic motor by varying position of a wobbler (28) in response to a servo valve control signal, a velocity transducer (72), coupled to a shaft (30) driven by the motor, for providing a velocity signal representative of the velocity of the shaft, and a wobbler position sensor (84), coupled to the wobbler, for producing a wobbler position signal indicative of the position of the wobbler, an improvement in accordance with the invention includes a controller (100) for producing the servo valve control signal as a function of a wobbler position command specifying a position of the wobbler wherein the wobbler position command is a function of at least one of the velocity signal representative of the velocity of the shaft and the wobbler position signal.

21 Claims, 3 Drawing Sheets

HIGH PERFORMANCE CONTROLLER FOR VARIABLE DISPLACEMENT HYDRAULIC MOTORS

DESCRIPTION

1. Technical Field

The present invention relates to controls for variable displacement hydraulic motors. More particularly, the present invention relates to controls for variable displacement hydraulic motors used for powering actuators in airplanes having high resolution, stiffness, large load driving capability and speed of response.

2. Background Art

U.S. Pat. No. 4,487,109, which is assigned to the assignee of the present invention, discloses a control system for a variable displacement hydraulic motor. FIG. 1 illustrates the system disclosed in the '109 patent including the basic proportional controls for a variable displacement hydraulic motor. The system is comprised of a variable displacement hydraulic motor (VDHM) 12 of conventional construction, and an electro-hydraulic servo valve (EHSV) 14 which functions in a manner to control the displacement of the hydraulic motor 12 in a manner described below and a servo control system 16 containing three proportional controls as described below. As illustrated, the VDHM 12 is an axial piston motor but it should be understood that the present invention is not limited to any form of hydraulic motor. The VDHM 12 has a plurality of pistons 18 which are carried within a series of longitudinal bores within a cylinder block 20. Port plate 22 has a high pressure port 24 for receiving pressurized hydraulic fluid from a source (not illustrated) and an output port 26 which discharges hydraulic fluid for flow back to the source of hydraulic fluid. The flow of hydraulic fluid into the cylinders is controlled by the relative position of the port plate with respect to the rotating cylinder block 20. Wobbler 28 has a variable inclination with respect to drive shaft 30 which applies torque to a load 32. The angle of inclination of the wobbler 28 is varied by the axial position of the piston rod 34. The angular position of the wobbler 28 with respect to the drive shaft controls the displacement of the VDHM 12 with variations in displacement being produced by control of the axial position of piston rod 34.

The EHSV 14 is hydraulically coupled to piston 36 by means of hydraulic lines 38 and 40. Pressurized hydraulic fluid is applied to the EHSV 14 by hydraulic line 42 and is returned to the source of pressurized hydraulic fluid by hydraulic line 44. The EHSV 14 contains a movable valve 46 which is controlled by a servo valve control signal outputted from the servo controller 16. The servo valve control signal causes armature 48 to pivot about pivot point 50.

The servo controller 16 has three separate control loops which each contain a proportional control of conventional construction. The first loop 52 is responsive to a position command 54 and a feedback signal 56 which is derived from a conventional position sensor 58 which is mechanically coupled to the drive shaft to detect its position. Summer 60 takes the difference between the position command and the feedback signal 56 produced by the position sensor 58. A suitable operational amplifier 62 having an amplification characteristic Kp amplifies the output signal from the position sensor. The amplification characteristic Kp is a function of the system in which the VDHM 12 is utilized including the load 32 being driven. The output from the operational amplifier 62 is applied to a suitable limiter 64 to prevent overdriving of the output velocity command 68 produced by the limiter. The second loop 66 is a velocity control loop which is responsive to an input velocity command 68 and a feedback velocity signal 70. The velocity signal 70 is produced by a velocity transducer 72. Summer 74 produces an output signal which is equal to the difference between the input velocity command 68 and the feedback velocity signal 70. Operational amplifier 76 amplifies the output signal from summer 74. The gain of the operational amplifier 76 is a function of the VDHM 12 including the load 32 being driven. The output signal from the operational amplifier 76 is applied to a limiter 78 to prevent overdriving. The third loop 80 is responsive to an input wobbler position command 82 and a feedback signal 86 produced by wobbler position sensor 84. Summer 86 produces an output signal 88 which is equal to the difference between the wobbler position command 82 and the feedback signal from the wobbler position sensor 84. The output signal 88 is amplified by operational amplifier 90 having a gain which is a function of the VDHM and the load 32 being driven to produce the servo valve control signal. The servo valve control signal 92 is amplified by current driver 94.

The system of FIG. 1 has been modified to have an integrator in parallel with the proportional control provided by operational amplifier 76. U.S. Pat. application Ser. No. 298,751, entitled "Torque Velocity Control For Variable Displacement Motor", filed on Jan. 19, 1989, which is assigned to the assignee of the present invention discloses a variable displacement hydraulic motor control having a velocity control loop with an integrator in parallel with a proportional amplifier. The integral control provided by the addition of an integrator provides an accurate control of the motor speed permitting system operation at a maximum speed and increases the stiffness of control.

However, the addition of an integrator to the system of FIG. 1 is not sufficient to provide for the performance required for a hydraulically powered actuator driven by a variable displacement motor for applications in actuators requiring performance characteristics of high resolution, stiffness, and speed of response in driving a load to a commanded position such as in high performance aircraft. A high bandwidth speed control loop is required to achieve the required performance. To achieve higher bandwidth it is necessary to increase the gain of both the proportional amplifier and the integrator in parallel with the proportional amplifier which may cause system instability and an oscillation.

To increase the gain of the velocity control loop of the system of FIG. 1, motor acceleration feedback could be added. The disadvantage of this is that an additional acceleration sensor would be required with the attendant expense or, alternatively, a differentiator could be added to compute acceleration from the velocity sensed by the velocity transducer. However, it is known that a differentiator amplifies noise and may cause amplifier saturation or unwanted oscillations.

FIG. 2 illustrates a block diagram of the transfer function of the system of FIG. 1 which has been modified to contain an integrator 110 in parallel with the proportional amplifier 76. Like reference numerals illustrate parts in FIGS. 1 and 2. Standard operator notation is used wherein s is the variable. The information within each block represents the transfer function of the element which the block identifies. $K_1$ is the gain between a commanded position of the element being driven and the actual output position, $K_2$ is the gain between the wobbler piston position and the motor velocity and $K_3$ is the motor velocity sensor gain. The term "a" is a pole position of the wobbler position control and "b" is a pole position of the velocity control loop. $V_{xp}$ is a voltage corresponding to wobbler position. The transfer function of FIG. 2 which is a third order function of S is set forth below:

$$\frac{K_1 K_2 (K_I + K_v s)}{s^3 + (a+b)s^2 + (ab + K_1 K_2 K_3 K_v)s + K_1 K_2 K_3 K_I} \quad (1)$$

DISCLOSURE OF INVENTION

The present invention provides a control system for a variable displacement hydraulic motor for positioning a load at a commanded position with high resolution, stiffness, load moving capability and speed of response. The invention may be used as a control system for an actuator of primary and secondary flight controls in a high performance aircraft such as fighter aircraft. With the invention, the speed control loop for the variable displacement hydraulic motor is modified from the prior art of FIG. 1 to contain at least one proportional term not found in the prior art which simulates the feedback which would be obtained from motor acceleration feedback as described above without the attendant deficiencies of amplifying noise, causing amplifier saturation and unwanted oscillations. The proportional terms may be derived from feedback of the motor velocity and/or the position of the wobbler control piston or the sum thereof. In a preferred form of the invention, a sum is computed between the velocity signal and the position of the wobbler control piston which is subtracted from a signal which is a proportional and integral function of the difference between a velocity command and the feedback velocity signal to produce a wobbler position command. A signal which is a function of the difference between the wobbler position command and the position of the wobbler control piston is used for controlling the activation of the electrohydraulic servo valve.

In a control for a variable displacement hydraulic motor having an electrically controlled hydraulic servo valve for controlling the displacement of the hydraulic motor by varying a position of a wobbler in response to a servo valve control signal, a velocity transducer, coupled to the shaft driven by the motor, for producing a velocity signal indicative of the velocity of the shaft and a wobbler position sensor, coupled to the wobbler, for producing a wobbler position signal indicative of the position of the wobbler, an improvement in accordance with the present invention includes a controller for producing the servo valve control signal as a function of a wobbler position command specifying a position of the wobbler wherein the wobbler position command is a function of at least one of the velocity signal indicative of the velocity of the shaft and the wobbler position signal. The wobbler position command may be a function of the velocity signal indicative of the velocity of the shaft, a function of the wobbler position signal or a function of the sum of the velocity signal representative of the velocity of the shaft and the wobbler position signal. The controller further includes a limiter having an input coupled to a difference between the quantity equal to a velocity command, specifying a velocity of the motor, and a signal representative of the velocity of the motor and a signal which is a function of at least one of the velocity signal representative of the velocity of the shaft and the wobbler position signal for limiting the wobbler position command to produce a limiting function of the servo valve control signal.

A method of controlling a variable displacement hydraulic motor having an electrically controlled servo valve for controlling the displacement of the hydraulic motor by varying position of a wobbler in response to a servo valve control signal, a velocity transducer, coupled to the shaft driven by the motor, for producing a velocity signal representative of the velocity of the shaft, and a wobbler position sensor, coupled to the wobbler, for producing a wobbler position signal indicative of the position of the wobbler in accordance with the invention includes generating a wobbler position command as a function the velocity signal indicative of the velocity of the shaft and the wobbler position signal specifying a position of the wobbler; and generating a servo valve control signal which is a function of a difference between the wobbler position command and the wobbler position signal. The wobbler position command may be of a function of a sum of the velocity signal indicative of the velocity of the shaft and the wobbler position signal. The method further includes limiting the wobbler position command to produce a limiting of the servo valve control signal.

A control for a variable displacement hydraulic motor in accordance with the invention includes an electrically controlled hydraulic servo valve for controlling the displacement of the hydraulic motor by varying a position of a wobbler in response to a servo valve control signal; a velocity transducer, coupled to the shaft driven by the motor, for producing a velocity signal representative of the velocity of the shaft; a wobbler position sensor, coupled to the wobbler, for producing a wobbler position signal indicative of the position of the wobbler; and a controller for producing the servo valve control signal including a first summer which produces a first summer output signal that is a function of a difference between a commanded velocity signal and the velocity signal, a second summer which produces a second summer output signal that is a function of a difference between the first summer output signal and a signal proportional to at least one of the velocity signal indicative of the velocity of the shaft and the wobbler position signal and a third summer which produces a third summer output signal which is a function of a difference between the second summer output signal and the wobbler position signal with the servo valve control signal being a function of the third summer output signal. The second summer output signal may be a function of a difference between the first summer output signal and a signal proportional to the signal indicative of the velocity of the shaft, a signal proportional to the wobbler position signal or a sum of the velocity signal indicative of the velocity of the shaft and the wobbler position signal and the third summer output signal is proportional to the servo valve control signal. The invention further includes a limiter, coupled to the output of the second summer and to the third summer, for limiting the second summer output signal to produce a limiting function of the servo valve control signal.

A control for a variable displacement hydraulic motor contained in a servo system for positioning a load driven by the motor at a commanded position specified by a position command in accordance with the invention includes a position control loop containing a first summer producing a velocity command which is a function of a first difference signal equal to a difference between the position command and a position of the load sensed by a position transducer; a velocity control loop containing a second summer producing a second difference signal which is a function of a difference between the velocity command and a velocity of the motor sensed by a velocity sensor, the second difference signal being applied to an integrator and to a proportional amplifier respectively producing outputs applied to a third summer to produce a signal which is equal to a difference between the sum of the second difference signal amplified by the proportional amplifier and integrated by the integrator and a signal proportional to at least one of the velocity signal indicative of the velocity of the motor and a wobbler position signal representative of a position of a wobbler to produce a wobbler position command; and a wobbler position control loop containing a valve for controlling displacement of the hydraulic motor by varying position of the wobbler in response to a valve control signal applied to the valve and fourth summer for producing an output signal equal to a difference between the wobbler position command and a wobbler position sensed by a wobbler position sensor coupled to the valve which is a function of the valve control signal. The third summer output signal may be a function of a difference between the sum of the second difference signal amplified by the proportional amplifier and integrated by the integrator and the sum of the velocity signal representative of the velocity of the motor and the wobbler position signal representative of the position of the wobbler. The invention further includes a limiter coupled to the output of the third summer, for limiting the wobbler position command which is applied to the wobbler position control loop.

BEST MODE FOR CARRYING OUT THE INVENTION

Figure 2:
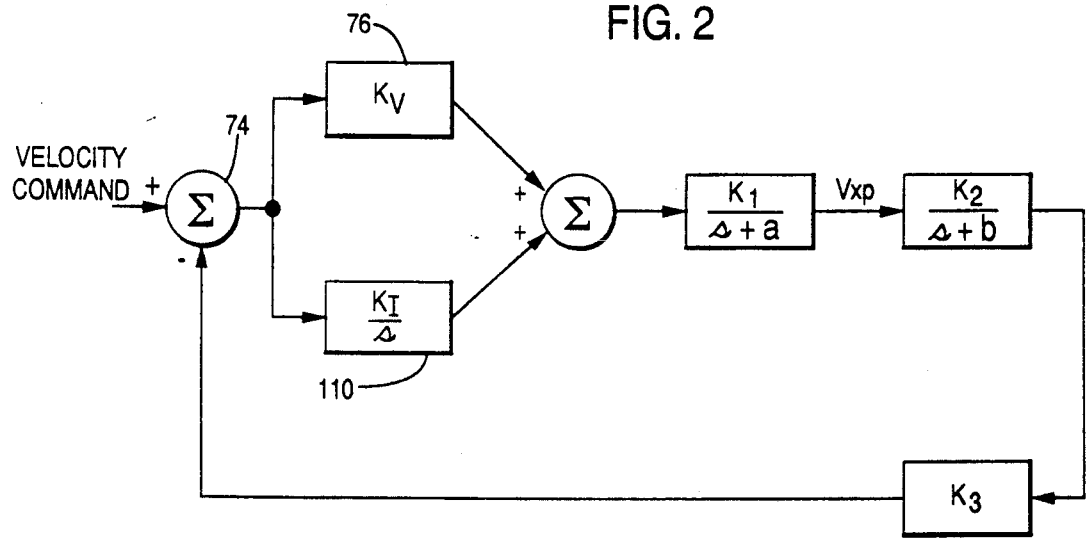
FIG. 2 illustrates a block diagram of the transfer function of the system of FIG. 1.
Figure 3:
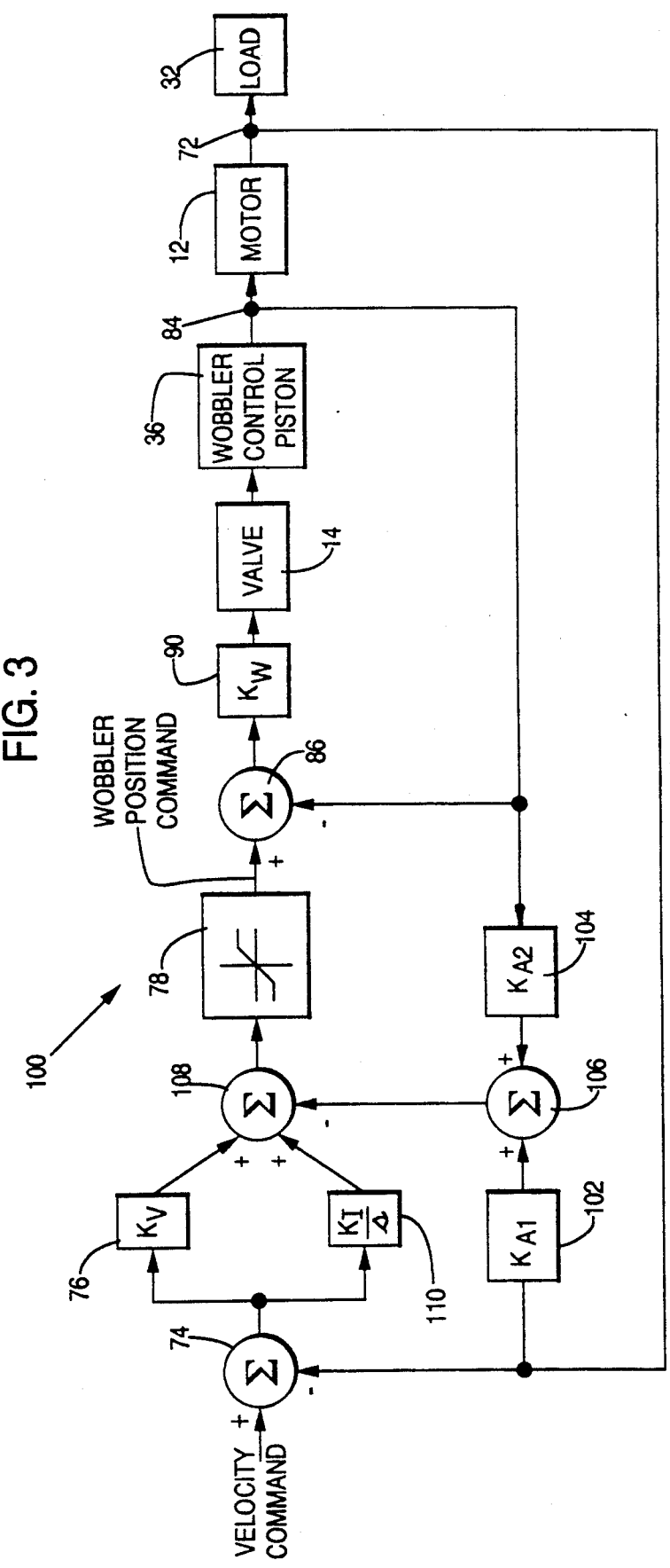
FIG. 3 illustrates a variable displacement hydraulic motor control system in accordance with the present invention.

FIG. 3 illustrates a control system of a variable displacement hydraulic motor in accordance with the present invention in which the load 32 is positioned at a commanded position. Like reference numerals identify like parts in FIGS. 1-3. The present invention is a modification of the velocity control loop of FIG. 1 with the remainder of the position control system being identical to FIG. 1. The position control system of FIG. 3 has the high resolution, stiffness and speed of response necessary for controlling actuators in a high performance aircraft to move a load to a commanded position. The improvement of the characteristics of the velocity control loop provided by the present invention enables the stringent requirements of a positioning system for a higher performance actuator to be met.

Figure 1:
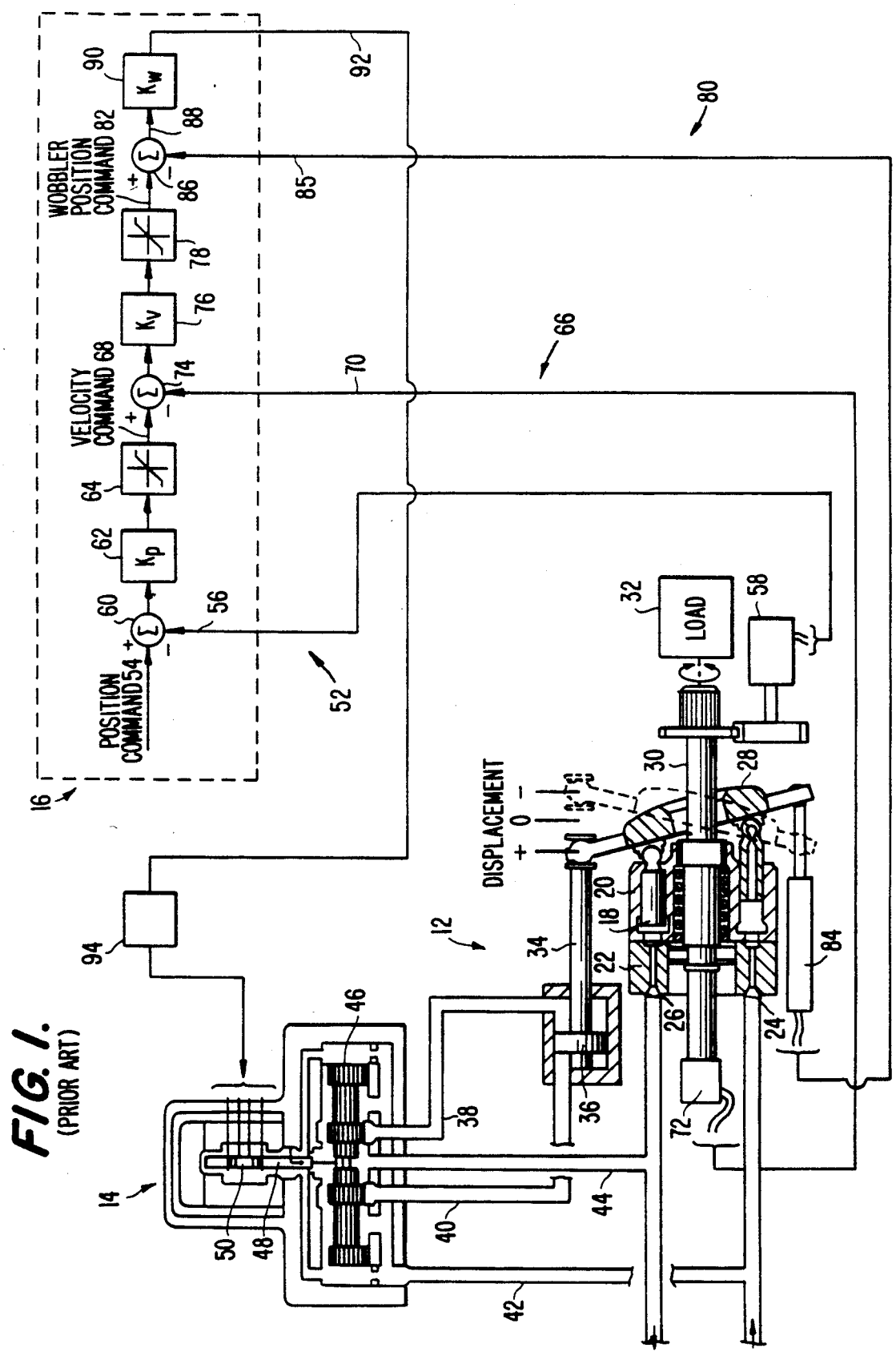
FIG. 1 illustrates a prior art variable displacement hydraulic motor control system of the type manufactured by the Assignee of the present invention.

The variable displacement hydraulic motor control system of FIG. 3 differs from the modification of the prior art system of FIG. 1 discussed above in that the wobbler position command which specifies a position of the wobbler under the control of piston 36 is a function of at least one of the velocity signal outputted by velocity sensor 72 which is representative of the velocity of the motor shaft and the wobbler position signal outputted by position sensor 84 and preferably is a function of the sum of the velocity signal representative of the velocity of the shaft and the wobbler position signal. Proportional amplifiers 102 and 104 respectively having gains of $K_{A1}$ and $K_{A2}$ respectively couple the velocity signal representative of the velocity of the shaft of the motor 12 and the wobbler position signal representative of the position of the control piston 36 of the wobbler to a summer 106 which combines the signals from the aforementioned sensors with the aforementioned gains. The resultant output signal from the summer 106 is applied to summer 108. The summer 74 produces a difference signal equal to the difference between a velocity command which is a commanded velocity outputted by the servo control and the velocity of the motor shaft. The output of the summer 74 is amplified by a proportional amplifier 76 and is integrated by an integrator 110. The output signals from the proportional amplifier 76 and the integrator 110 are applied to summer 108. The summer 108 computes the difference between the sum of the outputs of the proportional amplifier 76 and the integrator 110 and the output from the summer 106 as described above to generate the wobbler position command. The wobbler position command is limited by limiter 78 to limit its dynamic range. It should be noted that the functions performed by amplifiers 102 and 104 and summers 106 and 108 may be integrated into a single summing amplifier with different gains.

The variable displacement hydraulic motor control system of FIG. 3 has the advantage over the prior art of providing an increased gain and a stable response by simulating the effect of applying a term which is a function of motor acceleration as feedback in the velocity loop without the disadvantages of amplifying noise, causing amplifier saturation or unwanted oscillations.

Figure 4:
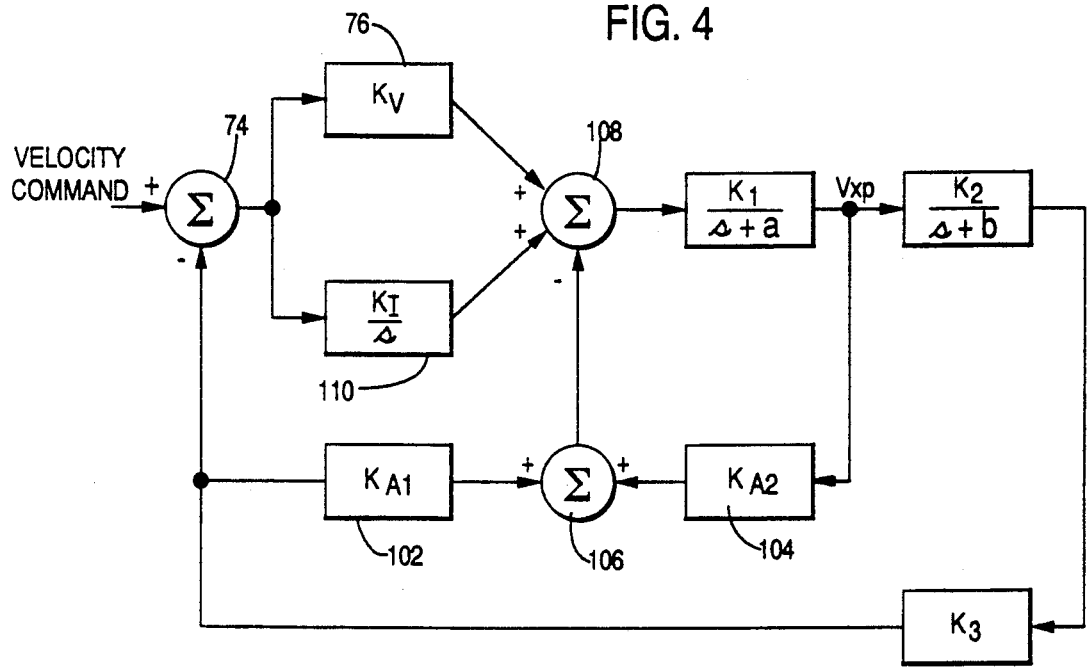
FIG. 4 illustrates the transfer function of the variable displacement hydraulic motor control system of FIG. 3.

FIG. 4 illustrates a block diagram of the transfer function of the system of FIG. 3. Like reference numerals identify like parts in FIGS. 1-4. The transfer function is a third order function of the operator s, like that of the system of FIG. 2, with the proportional amplification terms introduced by the proportional amplifiers 102 and 104 with the gains respectively of $K_{A1}$ and $K_{A2}$ introducing additional control terms.

The transfer function of FIG. 4 is set forth below:

$$\frac{K_1 K_2 (K_I + K_v s)}{s^3 + (a + b + K_1 K_{A2})s^2 + (ab + K_1 K_{A2} b + K_1 K_2 K_3 [K_v + K_{A1}])s + K_1 K_2 K_3 K_I} \quad (2)$$

A comparison of the denominators of the transfer function represented by equations (1) and (2) reveals that the system of FIG. 3 has the same order as the system with the transfer function represented by equation (1) while providing two more adjustable parameters which are represented by the proportional amplifications $K_{A1}$ and $K_{A2}$ and provides more flexibility in controller design. The equivalence of the transfer functions represented by equations (1) and (2) may be demonstrated by setting the terms $K_{A1}$ and $K_{A2}$ to zero which reduces equation (4) to the same form as equation (3).

While the invention has been described in terms of its preferred embodiment, it should be understood that numerous modifications may be made thereto without departing from the spirit and scope of the invention as defined in the appended claims. For example, while the input signal to the summer 108 which is subtracted from the sum of the outputs from the proportional amplifier 76 and integrator 110 is preferably equal to the sum of the amplifiers 102 or 104, only a single one of the proportional terms from amplifiers 102 and 104 may be used. This configuration also provides the benefit of an additional proportional amplifier which may be used to simulate the benefits of a signal which is a function of motor acceleration without the detriments described above. It is intended that al such modifications fall within the scope of the appended claims.

We claim:

1. A control for a variable displacement hydraulic motor comprising:
   an electrically controlled hydraulic servo valve for controlling the displacement of the hydraulic motor by varying a position of a wobbler in response to a servo valve control signal;
   a velocity transducer, coupled to a shaft driven by the motor, for producing a velocity signal representative of the velocity of the shaft;
   a wobbler position sensor, coupled to the wobbler, for producing a wobbler position signal indicative of the position of the wobbler; and
   a controller for producing the servo valve control signal including a first summer which produces a first summer output signal that is a function of a difference between a commanded velocity signal and the velocity signal, a second summer which produces a second summer output signal that is a function of a difference between the first summer output signal and a signal proportional to at least one of the velocity signal indicative of the velocity of the shaft and the wobbler position signal and a third summer which produces a third summer output signal which is a function of a difference between the second summer output signal and the wobbler position signal with the servo valve control signal being a function of the third summer output signal.

2. A control in accordance with claim 1 wherein:
   the second summer output signal is a function of the difference between the first summer output signal and a signal proportional to the signal representative of the velocity of the shaft; and
   the third summer output signal is proportional to the servo valve control signal.

3. A control in accordance with claim 1 wherein:
   the second summer output signal is a function of the difference between the first summer output signal and a signal proportional to the wobbler position signal; and
   the third summer output signal is proportional to the servo valve control signal.

4. A control in accordance with claim 1 wherein:
   the second summer output signal is a function of the difference between the first summer and an output signal produced by a fourth summer which is proportional to sum of the velocity signal indicative of the velocity of the shaft and the wobbler position signal; and
   the third summer output signal is proportional to the servo valve control signal.

5. A control in accordance with claim 1 further comprising:
   a limiter, coupled to the output of the second summer, and to the third summer for limiting the second summer output signal to produce a limiting function of the servo valve control signal.

6. A control in accordance with claim 2 further comprising:
   a limiter, coupled to the output of the second summer, and to the third summer for limiting the second summer output signal to produce a limiting function of the servo valve control signal.

7. A control in accordance with claim 3 further comprising:
   a limiter, coupled to the output of the second summer, and to the third summer for limiting the second summer output signal to produce a limiting function of the servo valve control signal.

8. A control in accordance with claim 4 further comprising:
   a limiter, coupled to the output of the second summer, and to the third summer for limiting the second summer output signal to produce a limiting function of the servo valve control signal.

9. In a control for a variable displacement hydraulic motor having an electrically controlled hydraulic servo valve for controlling the displacement of the hydraulic motor by varying a position of a wobbler in response to a servo valve control signal, a velocity transducer, coupled to a shaft driven by the motor, for producing a velocity signal representative of the velocity of the shaft and a wobbler position sensor, coupled to the wobbler, for producing a wobbler position signal indicative of the position of the wobbler, the improvement comprising:
   a controller for producing the servo valve control signal as a function of a wobbler position command specifying a position of the wobbler wherein the wobbler position command is a function of the velocity signal representative of the velocity of the shaft and the wobbler position signal.

10. A control in accordance with claim 9 wherein:
    the wobbler position command is a function of a sum of the velocity signal representative of the velocity of the shaft and the wobbler position signal.

11. A control in accordance with claim 9 wherein the controller further comprises:
    a limiter having an input coupled to a difference between a quantity equal to velocity command, specifying a velocity of the motor, and a signal representative of the velocity of the motor and a signal which is a function of at least one of the velocity signal representative of the velocity of the shaft and the wobbler position signal for limiting the wobbler position command to produce a limiting function of the servo valve control signal.

12. A control in accordance with claim 10 wherein the controller further comprises:
    a limiter having an input coupled to a difference between a quantity equal to velocity command, specifying a velocity of the motor, and a signal representative of the velocity of the motor and a signal which is a function of at least one of the velocity signal representative of the velocity of the shaft and the wobbler position signal for limiting the wobbler position command to produce a limiting function of the servo valve control signal.

13. A method of controlling a variable displacement hydraulic motor having an electrically controlled servo valve for controlling the displacement of the hydraulic motor by varying a position of a wobbler in repose to a servo valve control signal, a velocity transducer, coupled to a shaft driven by the motor, for producing a velocity signal representative of the velocity of the shaft, and a wobbler position sensor, coupled to the wobbler, for producing a wobbler position signal representative of the position of the wobbler comprising:
- generating a wobbler position command as a function of the velocity signal representative of the velocity of the shaft and the wobbler position signal specifying a position of the wobbler; and
- generating a servo valve control signal which is a function of a difference between the wobbler position command and the wobbler position signal.

14. A method in accordance with claim 13 wherein:
the wobbler position command is a function of a sum of the velocity signal representative of the velocity of the shaft and the wobbler position signal.

15. A method in accordance with claim 13 further comprising:
limiting the wobbler position command to produce a limiting of the servo valve control signal.

16. A method in accordance with claim 14 further comprising:
limiting the wobbler position command to produce a limiting of the servo valve control signal.

17. A control for a variable displacement hydraulic motor contained in a servo system for positioning a load driven by the motor at a commanded position specified by a position command comprising:
- a position control loop containing a first summer producing a velocity command which is a function of a first difference signal equal to a difference between the position command and a position of the load sensed by a position transducer;
- a velocity control loop containing a second summer producing a second difference signal which is a function of a difference between the velocity command and a velocity of the motor sensed by a velocity sensor, the second difference signal being applied to an integrator and to a proportional amplifier respectively producing outputs applied to a third summer to produce a signal which is equal to a difference between the sum of the second difference signal amplified by the proportional amplifier and integrated by the integrator and a signal proportional to at least one of the velocity signal representative of the velocity of the motor and a wobbler position signal representative of a position of a wobbler to produce a wobbler position command; and
- a wobbler position control loop containing a valve for controlling displacement of the hydraulic motor by varying position of the wobbler in response to a valve control signal applied to the valve and a fourth summer for producing an output signal equal to the difference between the wobbler position command and a wobbler position sensed by a wobbler position sensor coupled to the valve which is a function of the valve control signal.

18. A control in accordance with claim 17 wherein:
the fourth summer output is equal to a difference between the sum of the second difference signal amplified by the proportional amplifier and integrated by the integrator and a signal proportional to the velocity signal representative of the velocity of the motor.

19. A control in accordance with claim 17 wherein:
the additional summer output is equal to a difference between the sum of the second difference signal amplified by the proportional amplifier and integrated by the integrator and a signal proportional to the wobbler position signal.

20. A control in accordance with claim 17 wherein:
the additional summer output is equal to a difference between the sum of the second difference signal amplified by the proportional amplifier and integrated by the integrator and a sum of a signal proportional to the velocity signal representative of the velocity of the motor and the wobbler position signal.

21. A control for a variable displacement hydraulic motor in accordance with claim 17 further comprising:
a limiter coupled to an output of the third summer for limiting the wobbler position command which is applied to the wobbler position control loop.

* * * * *